March 18, 1952  F. V. COLLINS  2,589,777
PLASTIC-SEALING APPARATUS
Filed July 9, 1949
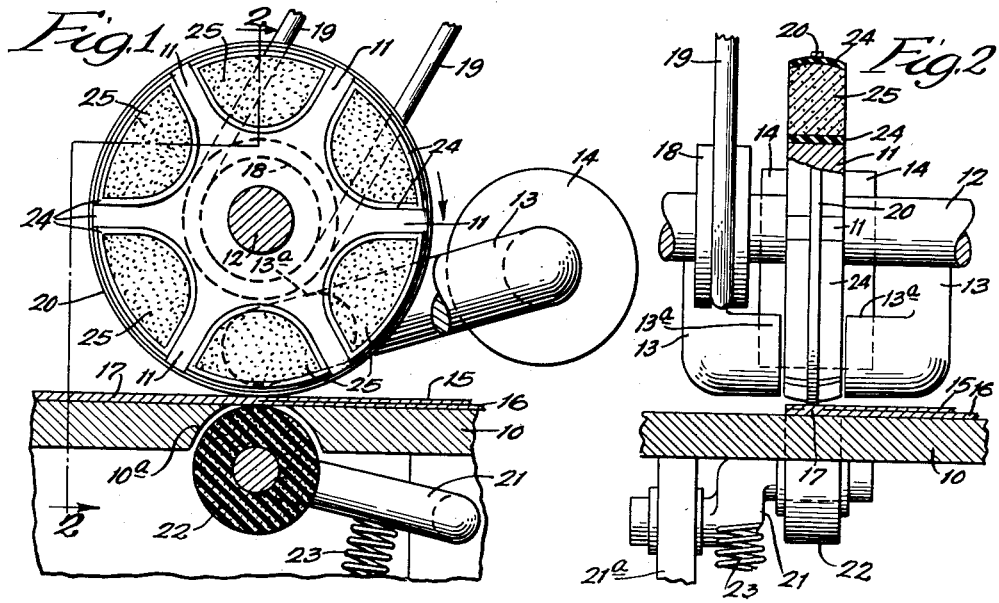
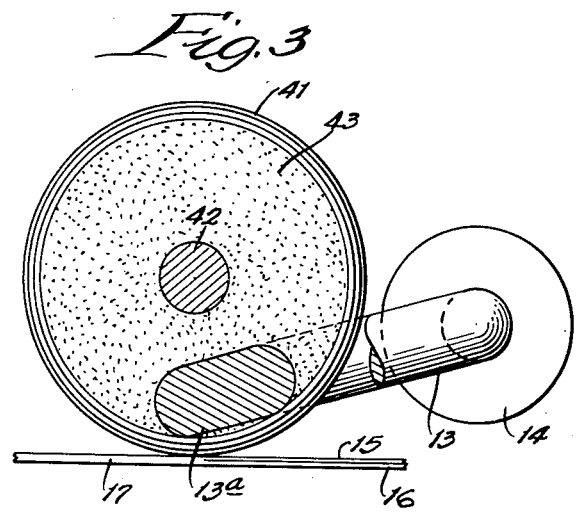
INVENTOR:
Fred V. Collins,
BY Dawson, Ooms, Booth & Haugenkey,
ATTORNEYS.

Patented Mar. 18, 1952

2,589,777

UNITED STATES PATENT OFFICE 2,589,777

PLASTIC-SEALING APPARATUS

Fred V. Collins, Des Plaines, Ill., assignor to
William F. Stahl, Kenilworth, Ill.

Application July 9, 1949, Serial No. 103,792

4 Claims. (Cl. 219—47)

1

This invention relates to apparatus for the sealing of plastics; in particular, it concerns an improved rotary apparatus for forming a seam seal between sheets of plastic material.

Sealing together of thermoplastic materials, such as polyethylene and polystyrene, by application of heat is an art which has been growing tremendously in importance in recent years. The earliest technique for forming such seals in general use was the so-called hot-bar method in which a member was heated by any suitable means to a temperature sufficient to melt the plastic being sealed and was then placed in contact with the adjoined plastic sheets. Heat from the hot bar would melt the plastic sheets and, on removal of the hot bar, the plastic would cool and re-set as a unitary piece.

In the formation of continuous or intermittent seam seals, the hot-bar principle was employed in the form of a heated roller under or over which the plastic sheets would be passed.

Hot-bar sealing, in either the form of a reciprocating sealing bar or a heated roller, has never been a satisfactory method of sealing many kinds of plastic materials. One objectionable effect of hot-bar sealing has been its tendency to over-heat the plastic surface immediately adjacent the hot bar or roller. The usual result of this over-heating has been "running" of the plastic and substantial spoilage of the material being sealed.

In other cases, when the temperature of the hot-bar or roller is reduced sufficiently to prevent "running" of the plastic, the sealing process is slowed down unreasonably, since under such circumstances considerable time is required for the heat to penetrate the plastic and heat the inner, adjoined surfaces sufficiently to effect a seal.

I have learned that the most effective and rapid means of sealing plastic sheets by externally applied heat is by maintaining the temperature of the sealing bar or roller normally below the fusion temperature of the plastic and raising that temperature rapidly while the sealing member is in contact with the plastic to be sealed. This procedure raises the internal temperature of the plastic rapidly, effects a good seal, and at the same time does not cause "running."

The particular invention described and claimed herein is an improved apparatus for achieving, in the formation of a seam seal, the optimum condition wherein the temperature of the sealing member is below the critical fusion temperature

2 when it first engages the plastic and is rapidly increased in temperature to effect sealing while the plastic and the sealing member are in contact.

It is accordingly a major object of my present invention to provide a rotary sealing member, capable of producing a seam seal in plastic sheets, wherein means are provided for maintaining the temperature of any given area of the sealing member below the fusion point when such area first comes in contact with the plastic, the temperature being thereafter rapidly increased to beyond the fusion point until after the plastic and the given area of the sealing member have moved apart.

A further object of my invention is to provide a rotary sealing member wherein energy from an electrical source is converted into heat for plastic sealing without necessity for slip rings or other sliding electrical contacts on the rotary member.

Still another object of my invention is to provide a rotary member for effecting seam seals on plastic sheets wherein heat is supplied to the rim of said member one sector at a time, any given sector being heated just as it rotates into engagement with the plastic sheets.

Other objects and advantages of my invention will appear as the specification proceeds.

I have illustrated two embodiments of my invention in the accompanying drawing, of which Figure 1 is a vertical sectional view of a preferred embodiment of my invention; Fig. 2, a view partly in section and partly in elevation of the Fig. 1 embodiment, the section being taken along the line 2—2 of Fig. 1; and Fig. 3 is a side view, partly in section, of a second or modified form of my invention.

In Fig. 1, a sealing table or flat surface 10 is indicated by a fragmentary showing. A pair of plastic sheets 15 and 16 are shown lying on said flat working surface 10, and, after passing through the sealing apparatus to be described, sheets 15 and 16 are sealed together to form the seam seal 17 between said plastic sheets.

The major components of my invention include the wheel 11, the iron core 13, and the magnet coil 14, wound on core 13.

Wheel 11 is mounted for rotation on a shaft 12 which may be supported over working surface 10 in any desired manner. I have shown a pulley 18, driven by a belt 19, as indicative of a suitable means of driving shaft 12; it will be understood that any desired means may be used.

Wheel 11, which is keyed to shaft 12, is made of metal and consists, in the embodiment shown, of a metal hub and six metal spokes, integrally formed from a single piece of stock. The constructional details of wheel 11, it is to be understood, may vary widely.

The sealing member proper is a band or rim 20 supported on the ends of the spokes of wheel 11 and made of Nichrome or other suitable electrical resistance wire.

Shaft 12 is positioned over working surface 10 so that the lower edge of Nichrome strip 20, which serves as a rim for wheel 11, is substantially flush with or slightly above the upper surface of table 10. A recess 10a in the lower side of table 10 accommodates a buffer or backing wheel 22, which may be made of wood, composition, soft rubber, or other suitable material. Backing wheel 22 is mounted on a shaft 21 which may be pivoted to any suitable position on table 10. In Fig. 2, a belt 21a is shown as a means for driving roller 22. If desired, positive drive for roller 22 may be dispensed with.

A spring 23 may be provided to urge roller 22 upward into recess 10a. The orientation of wheel 11 and roller 22 cause the plastic sheets 15 and 16, as they are moved along the surface of table 10, to pass between the rollers 11 and 22 at substantially the level of the top of table 10, as shown at Figs. 1 and 2.

The outer ends of the spokes of wheel 11 are in direct electrical contact with the Nichrome strip 20 which forms the actual sealing element. Spot welding or other suitable means may be employed to secure sealing member 20 to the terminals of the spokes of wheel 11 if desired.

The spaces or sectors between adjacent spokes on wheel 11 are filled in with magnetic core material 25. To maintain suitable isolation between the core sectors 25 and the metal hub and spokes, insulating material 24 is provided as a separator or gasket. In addition to the insulating layers 24 separating the core sectors from the spokes, it should be noted that an insulating layer 24 also separates the core sectors 25 from the sealing member 20 oriented around the rim of wheel 11.

The outer, peripheral portions of the magnetic core sectors 25 are curved to conform to the generally circular shape of wheel 11.

A magnetic core 13, having the usual U shape with its open ends extending inwardly to form pole pieces 13a, is mounted in any suitable manner above table 10, core 13 being oriented with respect to wheel 11 so that pole pieces 13a embrace wheel 11 adjacent the point wherein sealing member 20 comes in contact with plastic sheet 15. As may be seen from the position of the seam seal 17, the wheel 11 in the Fig. 1 example is designed for clockwise rotation. Accordingly, pole pieces 13a are oriented so that they extend backward in a counter-clockwise direction from the point of contact with plastic sheet 15.

A magnet coil 14 is wound on magnetic core 13 in the usual fashion and is connected to any convenient source of low-frequency alternating current (connections not shown). As may be best seen from Fig. 2, the gap between pole pieces 13a is only slightly larger than necessary to accommodate wheel 11, so that when one of the magnetic core sectors 25 is interposed between pole pieces 13a, a substantially complete magnetic circuit is formed, broken only by the extremely small air gaps separating the wheel 11 from the pole pieces 13a.

In the operation of my invention, low-frequency alternating current is passed through coil 14 in sufficient magnitude to produce a powerful alternating magnetic field in core 13. Wheels 11 and 22 are thereupon set into motion and the plastic sheets 15 and 16 move between the two rollers and in the direction to the left as Fig. 1 is viewed. As one of the magnetic core sectors 25 moves between the pole pieces 13a, a heavy circulating current is set up in the loop circuit formed by two of the spokes of wheel 11, the hub of wheel 11, and the sector of Nichrome wire 20 connecting said pair of spokes. Virtually all the electrical resistance in that loop circuit is found in the Nichrome wire sector. As a result, virtually all the energy drawn from the magnetic field by the loop circuit is dissipated in the Nichrome portion thereof. This dissipation of energy results in heating very rapidly the sector of Nichrome wire under consideration, with the result that, long before the magnetic core sector under consideration has passed beyond pole pieces 13a, the Nichrome wire adjacent thereto is well above the critical fusion and sealing temperature of the plastic sheets 15 and 16. As wheel 11 rotates, the particular magnetic core sector just described passes beyond pole pieces 13a and the circulating currents in the loop circuit just described drop off to a negligible magnitude. Meanwhile, however, the succeeding magnetic core sector has moved into the influence of pole pieces 13a and the next segment of Nichrome wire is accordingly being heated toward fusion temperature.

As may be seen from observation of Fig. 1, the wheel 11 therein shown has six such magnetic core sectors, with the result that six loop circuits exist, each comprising a portion of the Nichrome sealing member 20. Each of those loop circuits is in turn brought within the influence of pole pieces 13a and the corresponding Nichrome sector is accordingly heated to sealing temperature while it is in contact with the plastic sheets 15 and 16. In each case, after a core sector has passed beyond pole pieces 13a, the segment of Nichrome sealing member 20 associated therewith cools off and remains cool until it next is brought into the range of pole pieces 13a on the next rotation of wheel 11.

The seals formed by the sealing apparatus just described are found to be superior in strength and continuity to those obtained by the prior-art methods of sealing with externally applied heat. The sealing member 20 on the rim of wheel 11 does produce, in sheets 15 and 16, a continuous seam seal 17, for the reason that enough heat is carried by conduction from the sector of element 20 being heated by circulating current to raise the temperature of the following portion of element 20 which is in direct contact with a spoke of wheel 11. As a result, there is no discontinuity in the seam seal produced by the embodiment shown in Fig. 1.

Should a discontinuous seam seal be desired, as might be the case in many applications, it will be obvious to those skilled in the art that the ends of the spokes of wheel 11 can be trimmed slightly so as to form a radial recess in the sealing member 20 at the points where member 20 is secured to the spokes of wheel 11. Similarly, by appropriate modification of wheel 11 and its associated structure, seals of particular length and conformation can be produced at will.

In Fig. 3, I have shown a modified form of my invention in which I make use of a high-loss ferrous core material as a means of obtaining localized heat. In the Fig. 3 embodiment, the metal rim 41, which may be made of copper or any heat-conducting metal, serves as the sealing member and rim or wheel 43. Wheel 43 is carried on a shaft 42 which corresponds to shaft 12 of Fig. 1.

Wheel 43, apart from rim 41, may be formed entirely of a ferrous core material, preferably powdered iron suspended in a resinous or ceramic binder. If such a core material be used, the iron chosen should be of a type having very high loss characteristics, from hysteresis or eddy currents. Powdered iron cores for magnetic apparatus are well known, and are commercially available in many different types, including the high-loss type preferable for apparatus of the sort shown in Fig. 3.

A ferrous core 13 and magnet coil 14 are provided for the Fig. 3 embodiment, and are oriented in the same manner as in the Fig. 1 form of the invention. While table 10 and the wheel 22 and other incidental components of the sealing structure are not shown in Fig. 3, it will be understood that these may be identical to the corresponding elements of the apparatus of Fig. 1.

In the operation of the Fig. 3 embodiment, the portion of wheel 43 which is within the influence of the pole pieces 13a of core 13 will grow hot as a result of energy dissipated therein from the intense magnetic field. This will cause the adjacent portion of sealing member 41 to reach a temperature sufficiently high to fuse and seal the plastic sheets 15 and 16 to form seam seal 17. As the wheel rotates, the heated portion passes beyond the influence of pole pieces 13a and thereupon cools off until it is again re-heated on the next revolution when it again comes between pole pieces 13a.

While I have shown and described herein two specific embodiments of my invention for purposes of illustration, it will be understood that many changes in detail may be made by those skilled in the art without departing from the spirit of my invention.

I claim:

1. Apparatus for sealing plastics comprising a wheel mounted for rotation, the rim thereof being formed of electrical resistance material, electrically conducting means mounted in the plane of the wheel operative to connect together a plurality of pairs of points on the rim to form a plurality of loop circuits spaced around said rim, each of said loop circuits comprising a portion of said rim, and magnetic means mounted adjacent the wheel for passing an alternating field therethrough, said magnetic means and said wheel being relatively oriented non-symmetrically, such that the magnetic field in a particular zone of said wheel near the rim thereof is substantially stronger than said field at any other portion of said wheel, said loop circuits upon rotation of said wheel passing successively through said zone of strongest field and being at all other times in zones of weaker magnetic fields, whereby in any position of said wheel the magnitudes of the induced currents in said loop circuits are sharply unequal.

2. Apparatus according to claim 1 wherein each of said loop circuits is provided with a high-permeability core carried by the wheel therewithin.

3. Apparatus according to claim 1 wherein each of said loop circuits is provided with a high-permeability core carried by the wheel therewithin, said core being formed of ferrous material having high-loss properties, whereby said rim is selectively heated by circulation of induced currents in said loop circuits, the hottest portion of said rim being always the portion passing through said zone of strongest field.

4. Apparatus for sealing plastics comprising a wheel mounted for rotation, the rim thereof being formed of electrical resistance material, said wheel containing also in the plane of said rim a high-permeability core of ferrous material having high-loss properties, and magnetic means mounted adjacent the wheel for passing an alternating field therethrough, said magnetic means and said wheel being relatively oriented non-symmetrically, such that the magnetic field in a particular zone of said wheel near the rim thereof is substantiallly stronger than said field at any other portion of said wheel, whereby the dissipation of energy in said wheel from said field is sharply localized in said zone of strongest field, the portion of said rim passing at any given time through said zone of strongest field being thereby heated to a substantially greater extent than the other portions of said rim.

FRED V. COLLINS.

REFERENCES CITED

The following references are of record in the file of this patent:

UNITED STATES PATENTS

| Number | Name | Date |
| --- | --- | --- |
| 2,044,263 | Stoyan | June 16, 1936 |
| 2,114,833 | Fincke | Apr. 19, 1938 |
| 2,177,299 | Fredrickson | Oct. 24, 1939 |
| 2,372,737 | Phillips, Jr. | Apr. 3, 1945 |
| 2,443,749 | Stunkel | June 22, 1948 |